United States Patent [19]

Hayashi et al.

[11] 4,067,838
[45] Jan. 10, 1978

[54] CHELATE-FORMING AQUEOUS RESIN COMPOSITION

[75] Inventors: Masaaki Hayashi, Kamakura; Kazuyoshi Tsuneta, Yokohama; Hiroharu Sasaki, Kamakura; Hiroshi Takada, Yokohama, all of Japan

[73] Assignee: Dai Nippon Toryo Co., Ltd., Japan

[21] Appl. No.: 657,593

[22] Filed: Feb. 12, 1976

[30] Foreign Application Priority Data

Feb. 15, 1975 Japan .................................. 50-19332
Oct. 22, 1975 Japan ................................. 50-127203
Dec. 25, 1975 Japan ................................. 50-155456

[51] Int. Cl.² ...................... C08L 37/00; C08L 63/02; C08L 63/04; C08L 63/08
[52] U.S. Cl. ...................... 260/29.2 TN; 260/18 EP; 260/18 PN; 260/29.2 EP; 260/29.3; 260/29.6 R; 260/29.6 NR
[58] Field of Search ............. 260/29.2 EP, 29.3, 29.6, 260/47 EN, 2 N, 18 EP, 29.2 TN, 18 PN

[56] References Cited

U.S. PATENT DOCUMENTS 3,390,124  6/1968  Kittridge et al. ............... 260/47 EN
3,847,849  11/1974  Lackner ..........................260/29.2 EP

*Primary Examiner*—Carman J. Seccuro
*Attorney, Agent, or Firm*—Bucknam and Archer

[57] ABSTRACT

A chelate-forming two-pack type aqueous resin composition comprising (i) an aqueous dispersion of a resin containing in the molecule at least 2 epoxy groups and (ii) a reaction product formed between an amino curing agent containing in the molecule at least 2 nitrogen atoms and active hydrogen atoms bonded thereto and protocatechuic acid and/or gallic acid is disclosed.

15 Claims, No Drawings

CHELATE-FORMING AQUEOUS RESIN COMPOSITION

BACKGROUND OF THE INVENTION

1. Field of the Invention

This invention relates to an aqueous coating resin composition mainly for use in forming anticorrosive coatings, which comprises an aqueous dispersion of a resin containing in the molecule at least 2 epoxy groups and a curing agent composition including a compound having a chelate-forming capacity.

2. Description of the Prior Art

Vehicles now used for paints include a variety of resins, for example, unsaturated fatty acids, alkyd resins, olefin type resins, diene type resins, acrylic resins, polyester resins, epoxy resins, urethane resins and copolymers of these resins. Among them, epoxy resins are excellent in physical properties (adhesion to substrates and hardness) and chemical properties (resistances to chemicals) and the demand for epoxy resins as vehicles for paints has been increasing.

Recently, it has become an important requirement that paints should not be dangerous or harmful. Namely, paints are required to have a much reduced inflammability and no toxicity to the human body.

As one paint meeting such requirements, there has been developed a so-called aqueous paint comprising an epoxy resin dispersed, emulsified or dissolved in water. Coating epoxy resin compositions of this type are disclosed in, for example, the specifications of U.S. Pat. No. 2,811,495, U.S. Pat. No. 2,899,397, U.S. Pat. No. 3,324,041, U.S. Pat. No. 3,355,409, U.S. Pat. No. 3,449,281 and U.S. Pat. No. 3,640,926.

A variety of other resin compositions have also been investigated and developed in the art as aqueous paints.

However, these known aqueous coating resin compositions are still inferior to solvent type coating compositions with respect to such properties as moisture resistance, corrosion resistance and physical properties.

Various attempts have heretofore been made to reduce or overcome these shortcomings. For example, addition of rust inhibiting pigments such as lead cyanamide, lead suboxide, basic lead chromate, red lead, strontium chromate and zinc chromate has been proposed, but use of these pigments is not desirable because these pigments readily cause environmental pollution.

Further, none of the known aqueous coating resin compositions are completely satisfactory in various physical properties represented by the adhesion under a high humidity condition.

An aqueous epoxy resin paint causing no environmental pollution, which has properties comparable or superior to properties of heretofore used solvent type paints containing large quantities of organic solvents, has not yet been developed in the art.

Further, attempts have been made in the past to improve physical properties of coatings by incorporating into a paint a chelate-forming compound such as a polyhydric phenol, e.g., pyrogallol, a phenol carboxylic acid, a chromium-containing complex salt, a phthalocyanine, a pyridine, a derivative thereof or the like and causing a chelating reaction between the coating and the surface of an iron substrate.

As an old instance of a paint of this type, there is known a solvent type resin formed by merely incorporating tannin in a linseed oil type resin or a drying oil (see the specifications of British Pats. No. 826,564 and No. 826,566).

Later, R. N. Faulkner et al. developed a one-pack solvent paint formed by introducing catechol, pyrogallol, gallic acid or gallic acid ester in the form of a covalent bond into a vegetable oil, a fatty acid ester, an alkyd resin, a vegetable oil-modified epoxy ester resin or a vegetable oil-modified polyamide resin by utilizing a catalyst such as a metal alkoxide. Paints of this type are disclosed in, for example, the specifications of British Pat. No. 1,045,118 and U.S. Pats. No. 3,304,276 and No. 3,321,320, and Journal of the Oil and Colour Chemists' Association, 50, 524 (1967) published by the Oil and Colour Chemists' Association. Further, the specification of British Pat. No. 1,114,400 discloses a composition formed by reacting a styrene-allyl alcohole copolymer with a gallic acid ester.

Chelate-forming compositions including an epoxy resin are also known in the art. For example, there are known chelate-forming resins formed by modifying a part of epoxy groups with a monobasic fatty acid and reacting the remaining epoxy groups with a fatty acid derivative having a chelate-forming capacity and containing in the molecule at least two adjacent phenolic hydroxyl groups and one free carboxyl group (see Japanese Patent Publication No. 2439/73); compositions comprising a chelate-forming epoxy-polyamide resin formed by reacting residual epoxy groups of a reaction product formed between an epoxy resin and a polyamide resin having an amine value of up to 10, with gallic acid and incorporating therein, a phosphoric acid derivative (Japanese Patent Publication No. 17443/73); and a one-pack type or two-pack (an amine type curing agent being used) paint comprising a partially esterified product obtained by reacting a part of epoxy groups of an epoxy resin with salicylic or gallic acid or its ester, an epoxy, vinyl or fluoroethylene resin and an organic solvent as a diluent for the foregoing resin components (Japanese Patent Publication No. 4811/74 and Japanese Patent Application Laid-Open Specifications No. 56226/73, No. 56228/74, No. 122538/74 and No. 122597/74).

In each of the foregoing known paints, an organic solvent is used, and hence, they are still insufficient with respect to safety and prevention of environmental pollution. Further, when ingredients of these paints are examined, it is seen that in each of these known paints, the epoxy resin which is the main ingredient, is used in the modified state. In other words, each of these known compositions is a one- or two-pack paint formed by reacting all or a part of epoxy groups in the epoxy resin as the main ingredient with a chelate-forming compound, and therefore, excellent properties inherent in the epoxy resin are drastically lowered.

Still further, in the foregoing conventional chelate-forming solvent type paints, in order to promote the chelating reaction, it is necessary to incorporate polar solvents such as alcohols or chelating reaction promotors such as ferrous chloride, ferric chloride, organic acids and inorganic acids.

Aqueous paints having a chelate-forming capacity are also known in the art. For example, there can be mentioned a paint comprising as a vehicle an epoxidized styrene-butadiene copolymer (Japanese Patent Application Laid-Open Specification No. 8598/74); and a composition comprising an acrylic copolymer or styrene-butadiene copolymer emulsion and a gallic acid ester incorporated in the emulsion (Japanese Patent Publication No. 14412/73). Each of these compositions is defective in that a coating having a sufficient corrosion resistance cannot be obtained.

SUMMARY OF THE INVENTION

This invention relates to a novel aqueous resin composition having a chelate-forming capacity, in which the foregoing defects and disadvantages involved in the conventional techniques can be overcome or moderated.

Objects of this invention are as follows:

1. To provide a coating composition which can be applied regardless of the degree of surface treatment of formation of rust on the substrate and which causes a chelating reaction with the surface of an iron substrate.

2. To provide a coating composition which can give a coated film excellent in chemical and physical properties such as humidity resistance, corrosion resistance and adhesion under a high humidity condition.

3. To provide a coating composition which can give a coated film excellent in rust preventive property without incorporation of a particular rust-inhibiting pigment.

4. To provide a coating composition comprising water as the main medium, which has high handling safety and causes no environmental pollution.

Other objects and advantages of the present invention, especially improvements in the chemical and physical properties of resulting coated films will be apparent from the following detailed description.

In accordance with this invention, there is provided a two-pack type aqueous resin composition comprising (1) an aqueous dispersion of a resin having in the molecule at least 2 epoxy groups and (2) a reaction product formed between an amino curing agent having in the molecule at least 2 nitrogen atoms and active hydrogen atoms bonded thereto and protocatechuic acid and/or gallic acid.

DETAILED DESCRIPTION OF THE PREFERRED EMBODIMENTS

The "resin having in the molecule at least 2 epoxy groups" used in this invention (hereinafter referred to as "an epoxy group-containing resin") includes (a) an epoxy group-containing epoxy resin and (b) an epoxy group-containing vinyl resin.

a. Epoxy group-containing epoxy resin:

As the epoxy group-containing epoxy resin, the following can be mentioned:

1. Product having an average molecular weight of about 300 to about 8000 and an epoxy equivalent of about 150 to about 4000, which are represented by the following general formula:

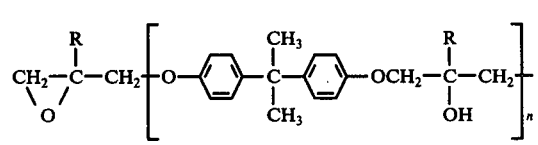

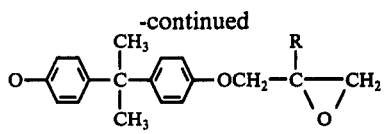

wherein $n$ is an integer between 0 and 12 inclusive and R stands for H, $CH_3$ or $CH_2Ct$, and which are obtained by condensing bisphenol A with epichlorohydrin, $\beta$-methyl epichlorohydrin or 62 -chloromethyl epichlorohydrin.

Epoxy group-containing epoxy resins of this type are commercially available, for example, as Epikote 815, Epikote 828, Epikote 834, Epikote 864, Epikote 1001, Epikote 1004, Epikote 1007 and Epikote DX-255, each being a product manufactured by Shell Chemical Co.; Araldite GY-250, Araldite GY-252, Araldite GY-260, Araldite GY-280, Araldite 6071, Araldite 6084, Araldite 6097 and Araldite 6099, each being a product manufactured by Ciba Geigy Corporation; DER 330, DER 331, DER 337 and DER 661, each being a product manufactured by Dow Chemical Co.; and Epiclon 800 and Epiclon 850, each being a product manufactured by Dainippon Ink & Chemicals Inc.

2. Phenolic novolak epoxy resins having an average molecular weight of about 350 to about 400 and an epoxy equivalent of about 170 to about 180, which are represented by the following general formula:

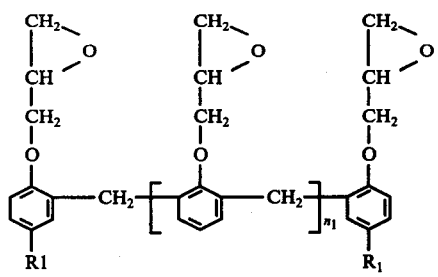

wherein $n_1$ is an integer between 0 and 2 inclusive and $R_1$ stands for H, $CH_3$, $C_2H_5$ or $C_3H_7$.

Epoxy group-containing epoxy resins of this type are commercially available, as, for example, Epikote 152 and Epikote 154 manufactured by Shell Chemical Co., DEN 431 and DEN 438 manufactured by Dow Chemical Co., and EPN 1138 manufactured by Ciba Geigy Corporation.

3. Polyglycol epoxy resins having an average molecular weight of about 350 to about 700 and an epoxy equivalent of 175 to 335, which are represented by the following general formula:

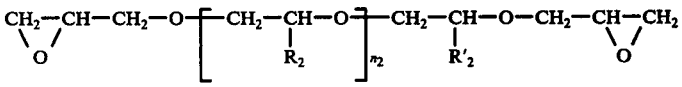

wherein $n_2$ is an integer between 0 and 4 inclusive and $R_2$ and $R'_2$ stand for H or $CH_3$.

Epoxy group-containing epoxy resins of this type are commercially available as, for example, Araldite CT-508 manufactured by Ciba Geigy Corporation and DER 732 and DER 736 manufactured by Dow Chemical Co.

4. Ester epoxy resins having an epoxy equivalent of about 170 to about 200, which are represented by the following general formula:

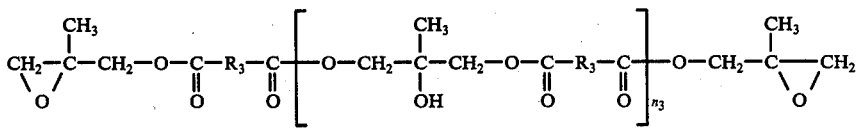

wherein $n_3$ is 0 or 1 and $R_3$ stands for $-CH_2$ m in which m is 0, 1 or 2.

Epoxy group-containing epoxy resins of this type are commercially available as, for example, Epiclon 200 and Epiclon 400 manufactured by Dainippon Ink & Chemical Inc.

5. Epoxidized polybutadiene resins having an oxiran oxygen content of 7.5 to 8.5% and a molecular weight of about 500 to about 1300, which are represented by the following general formula:

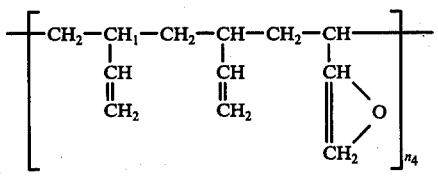

wherein $n_4$ is an integer between 3 and 8 inclusive.

Epoxy group-containing epoxy resins of this type are commercially available as, for example, BF-1000 manufactured by Nippon Soda Co. and Sumikaoil No. 50 manufactured by Sumitomo Chemical Co.

6. Epoxidized oils having an oxirane oxygen content of 6 to 9% and an average molecular weight of about 350 to about 1500, which are represented by the following general formula:

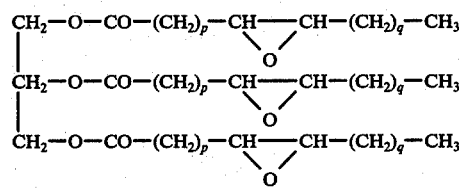

wherein $p$ and $q$ each are an integer between 1 and 10 inclusive.

Epoxy group-containing epoxy resins of this type are commercially available as, for example, ADK CIZER O-180 and ADK CIZER O-130P manufactured by Adeka Argus Chemical Co.

7. Brominated epoxy resins such as those commercially available as SR-BS (having an epoxy equivalent of 325 to 365) manufactured by Sakamoto Yakuhin Kogyo Co.; alicyclic epoxy resins such as those commercially available as Chissonox 201 (having an epoxy equivalent of 152 to 156) and Chissonox 206 (having an epoxy equivalent of 74 to 78) manufactured by Chisso Co.; and silicone-modified epoxy resins.

In this invention, among the foregoing epoxy group-containing epoxy resins, bisphenol epoxy resins, novolak epoxy resins and polyglycol epoxy resins are preferably employed. Especially bisphenol type epoxy resins are most preferably employed.

It is preferred that epoxy group-containing epoxy resins such as mentioned above be liquid at room temperature. However, even epoxy resins which are solid at room temperature can be conveniently used in the present invention when they are mixed with liquid epoxy resins or small quantities of water-soluble solvents are incorporated therein.

If desired, in order to use an epoxy resin solid at room temperature and improve the emulsifiability of this solid epoxy resin or to improve the workability of coating of the coating composition or the properties and appearance of the resulting coating, it is possible to use in combination up to 20% by weight of a monoepoxy compound having in the molecule one epoxy group. As such monoepoxy compound, there can be mentioned, for example, allyl glycidyl ether, 2-ethylhexyl glycidyl ether, methyl glycidyl ether, butyl glycidyl ether, phenyl glycidyl ether, styrene oxide, cyclohexene oxide, epichlorohydrin and compounds having one epoxy group, which are obtained by modifying an epoxy resin having in the molecule at least 2 epoxy groups, such as mentioned above, with a fatty acid or the like.

The above-mentioned epoxy group-containing epoxy resin that is used in this invention is emulsified in water by an anionic surface active agent and/or a non-ionic surface active agent according to a conventional method.

As the anionic surface active agent, there can be mentioned, for example, metal salts of fatty acids such as sodium oleate, potassium oleate, semi-hardened beef tallow sodium soap, semi-hardened beef tallow potassium soap and castor oil potassium soap; alkylbenzene sulfonates such as sodium dodecylbenzene sulfonate; and sulfuric acid esters of higher alcohols such as sodium lauryl sulfate, triethanolamine lauryl sulfate and ammonium lauryl sulfate.

As the non-ionic surface active agent, there can be mentioned, for example, polyoxyethylene alkylaryl ethers having the HLB value of 10.9 and 19.5, such as polyoxyethylene nonylphenyl ether and polyoxyethylene octylphenyl ether; polyoxyethylene alkyl ethers having an HLB value of 10.8 to 16.5, such as polyoxyethylene oleyl ether and polyoxyethylene lauryl ether; polyoxyethylene alkyl esters having an HLB value of 9.0 to 16.5, such as polyoxyethylene laurate, polyoxyethylene oleate and polyoxyethylene stearate; polyoxyethylene benzylated phenyl ether having an HLB value of 9.2 to 18; and sorbitol derivatives.

The foregoing surface active agents may be used singly or in the form of a mixture of two or more of them.

It must be noted that use of an excessive amount of the surface active agent often has undesired adverse effects on properties of the resulting coated film, for example, reduction of the water resistance. In general, better results are obtained when the surface active agent is added in an amount of 0.1 to 20% by weight based on the solid of the epoxy resin.

More specifically, in the present invention, about 20 to about 200 parts by weight of water is added to 100 parts by weight of the epoxy resin in the presence of the above-mentioned amount of the surface active agent, and the mixture is violently agitated to form an aqueous dispersion.

b. Epoxy group-containing vinyl resin:

As pointed out hereinbefore, the epoxy group-containing resin that is used in this invention includes a known epoxy group-containing vinyl resin. This epoxy group-containing vinyl resin in generally prepared by copolymerizing 5 to 30% by weight of an $\alpha,\beta$-ethylenically unsaturated monomer containing an epoxy group with 70 to 95% by weight of another $\alpha,\beta$-ethylenically unsaturated monomer copolymerizable with said epoxy group-containing monomer.

As the epoxy group-containing $\alpha,\beta$-ethylenically unsaturated monomer, there can be mentioned, for example, glycidyl acrylate, glycidyl methacrylate and allyl glycidyl ether. Two or more of these monomers may be used in combination.

As the $\alpha,\beta$-ethylenically unsaturated monomer copolymerizable with the epoxy group-containing monomer, there can be mentioned, for example, unsaturated acids such as acrylic acid, methacrylic acid, maleic acid and fumaric acid; acrylic acid esters such as methyl acrylate, ethyl acrylate, butyl acrylate, cyclohexyl acrylate, 2-hydroxyethyl acrylate and 2-hydroxypropyl acrylate; methacrylic acid esters such as methyl methacrylate, ethyl methacrylate, butyl methacrylate, cyclohexyl methacrylate, 2-ethylhexyl methacrylate, 2-hydroxyethyl methacrylate and 2-hydroxypropyl methacrylate: styrene type monomers such as styrene and vinyl toluene; and other monomers such as vinyl acetate, vinyl propionate, acrylamide, methacrylamide, acrylonitrile, vinyl stearate, allyl acetate, dimethyl itaconate, dibutyl fumarate, allyl alcohol, vinyl chloride, vinylidene chloride and ethylene. These monomers may be used singly or in the form of a mixture of two or more of them.

In case vinyl monomers having a functional group capable of reacting with an epoxy group under some reaction conditions, such as carboxyl or hydroxyl groups, are used, it must be noted that reaction conditions such as the amount of vinyl monomer, the reaction temperature and the reaction time should be selected so that no reaction is caused to occur between this functional group and the epoxy group.

The aqueous dispersion of the epoxy group-containing vinyl resin means a dispersion or suspension of the resin dispersed or suspended in an aqueous medium. This aqueous dispersion can generally be prepared by customary emulsion polymerization or suspension polymerization.

The emulsion polymerization can be performed by finely dispersing water-insoluble or slightly water-soluble starting monomers such as mentioned above into water in the presence of an emulsifier and polymerizing the monomers in the dispersed state at 30° to 100° C for 3 to 7 hours by using a water-soluble polymerization initiator such as potassium persulfate, ammonium persulfate or the like.

The emulsion polymerization is greatly influenced by the emulsifying capacity of the emulsifer used. The emulsifying capacity of the emulsifier is influenced by the kinds of the monomers used, the pH value of the aqueous phase, the temperature and other reaction conditions. Accordingly, it is necessary to select an appropriate emulsifier depending on the polymerization system.

Emulsifiers that can be used in this invention are classified by the kind of the hydrophilic group as follows; namely, anionic surface active agents such as alkali metal salts of fatty acids, e.g., sodium oleate and sodium alkyl sulfonate; cationic surface active agents such as amine salts and quaternary ammonium salts; and non-ionic surface active agents such as adducts of ethylene oxide to alkyl phenols.

These surface active agents may be used singly or in the form of a mixture of two or more of them.

It is necessary that the concentration of the emulsifier should be maintained at a level higher than the critical micelle concentration. In general, it is necessary that the concentration of the emulsifier should be 0.5 to 10% by weight based on the monomers.

If desired, a protective colloid may be added in order to prevent cohesion of monomer particles or emulsifier polymer particles.

As the protective colloid, there can be mentioned, for example, water-soluble polymers such as starch, pectin, alginates and gelatin; and modified natural polymers and synthetic polymers such as hydroxyethyl cellulose, methyl cellulose, carboxymethyl cellulose, polyvinyl alcohol, polyacrylic acid and polyvinylpyrrolidone.

The suspension polymerization is generally performed by violently agitating liquid monomers containing, dissolved therein, an initiator, which is generally oil-soluble, such as benzoyl peroxide, azobisisobutyronitrile or the like, in an aqueous medium in which the monomers are insoluble or slightly soluble, and polymerizing them in the finely dispersed state at 30° to 100° C. for 3 to 7 hours. Use of the above-mentioned protective colloid or emulsifier or a finely divided inorganic substance is preferred for dispersing the monomers in the aqueous medium. These additives are effective for preventing agglomeration of fine particles of the monomers or cohesion of suspended particles of the resulting polymer.

The "epoxy resin having in the molecule at least two epoxy groups" that is used in the present invention has hereinbefore been illustrated by dividing it into (a) the epoxy group-containing vinyl epoxy resin an (b) the epoxy group-containing vinyl resin. In this invention, both the resins have the substantially same functions.

The aqueous dispersion that is referred to in the instant specification includes not only a system in which the resin is dispersed but also a system in which part of the resin is dissolved. However, care should be taken when the latter system is employed, because the epoxy resin in such partially dissolved state is readily ring-opened and a composition providing a coating having sufficient properties can hardly be obtained.

In the foregoing manner, an aqueous dispersion having a non-volatile content of about 30 to 80% by weight, which is used as the main ingredient of the composition of this invention, is prepared.

Various additives may be incorporated in the aqueous dispersion used as the main ingredient of the composition of this invention according to need. For example, there may be incorporated extender pigments such as talc, precipitated barium sulfate and calcium carbonate, coloring pigments such as carbon black, titanium oxide, zinc white, red iron oxide, black iron oxide, micaceous iron oxide, aluminum powder, ultramarine blue, and phthalocyanine blue; reinforcing pigments such as glass fiber, glass flake, mice powder, synthetic silica and asbestos; and thickeners, rust-inhibiting agents, pollution-free rust inhibiting pigments, defoaming agents, swelling agent, curing promotors and chelating reaction promotors.

As the rust-inhibiting agent or pollution-free rust-inhibiting pigment, there can be mentioned, for example, sodium nitrite, phosphoric acid, ammonium phosphate, zinc phosphate, zinc molybdate and barium metaborate.

As the curing promotor, there ca be mentioned, for example, phenol, cresol, nonylphenol, bis-phenol A, salicyclic acid, resorcine, hexamethylene tetramine, 2,4,6-tris(dimethylaminomethyl)phenol and triethylene diamine. When a tiartiary amine is used, a low-temperature curing-promoting effect can be obtained.

As the chelating reaction promotor, there can be mentioned, for example, ferrous chloride, ferric chloride, an organic acid such as acetic acid and an inorganic acid such as hydrochloric acid.

In this invention, it is possible to use, in combination with the epoxy group-containing resin, other resin in a minor amount, preferably up to 20% by weight based on the epoxy group-containing resin. These additive resins need not be reactive with the epoxy groups of the epoxy group-containing resin or the amino group of a curing agent described hereinafter. These additive resins are incorporated so as to improve the coating workability of the composition and the properties and surface appearance of the resulting coating film. As examples of the additive resin, there can be mentioned melamine resins, urea resins, phenolic resins, hydrocarbon resins such as polybutadiene, alkyd resins, polyester resins, maleic oils, urethanated oils, coal tar, asphalt, xylene resins and vinyl resin emulsions.

The "amino curing agent having in the molecule at least 2 nitrogen atoms and active hydrogen atoms bonded thereto" that is used in the present invention include amino compounds customarily used as curing agents for epoxy resins, such as amine adducts, polyamides and polyamines.

Polyamide resins that are used in the present invention are products obtained by condensing dimer acid (or ordinary industrial product includes about 3% of monomer acid, about 85% of dimer acid and about 12% of trimer acid) with a polyamine such as ethylene diamine, diethylene triamine or metaphenylene diamine. These polyamide resins are commercially available as, for example, Tohmides Y-25, 245, 2400 and 2500 manufactured by Fuji Kasei Kogyo Co.; Genamid 2000 and Versamids 115, 125 and DSX-1280 manufactured by Dai-Ichi General Co.; Sunmides 320 and 330 manufactured by Sanwa Chemical Ind. Co.; and Epikures 3255 and 4255 manufactured by Shell Chemical Co.

Amine adduct resins that are used in the present invention are products obtained by the addition reaction between the above-mentioned epoxy resin, such as a bisphenol epoxy resin, and a polyamine such as ethylene diamine, diethylene triamine or metaphenylene diamine. These amine adduct resins are commercially available as, for example Tohmide 238 and Fujicura 202 manufactured by Fuji Kasei Kogyo Co., and Adeka Hardner EH-531 manufactured by Asahi Electro-Chemical Co.

As another example of the amine aduct resin that can be used in this invention, there can be mentioned a product obtained by the addition reaction between butyl glycidyl ether, glycidyl ester of Versatic Acid or a bisphenol type epoxy resin and a heterocyclic diamine represented by the following formula:

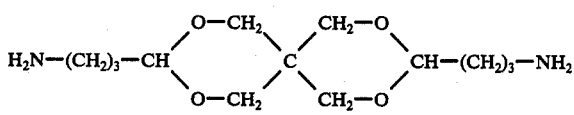

Amine adduct resins of this type are commercially availabe as, for example, Epomates B-002, C-002 and S-005 manufactured by Ajinomoto Co.

The foregoing curing agents may be used singly or in the form of a mixture of two or more of them.

In order to cause the cross-linking reaction between the curing agent and the epoxy group-containing resin, it is indispensable that the curing agent should have in the molecule at least 2 nitrogen atoms and active hydrogen atoms bonded thereto.

The curing agent to be used in the invention need not satisfy other particular requirements. However, in view of the act that the curing agent is dispersed in water, it is preferred that the amine value of the curing agent be higher than 100. However, use of a curing agent having too high an amine value results in the disadvantage that the pot life of the composition after the curing agent is incorporated in the epoxy resin as the main ingredient is shortened. Further, the viscosity of the curing agent should also be taken into account, because the properties of both the coating and the coated film are greatly influenced by the viscosity of the curing agent. In general, use of a curing agent having a high viscosity reduces the adaptability to the coating operation and shortens the pot life. These shortcomings, however, can be moderated by addition of a small amount of a water-soluble solvent. As this water-soluble solvent, there can be mentioned, for example, alcohols such as methanol and ethanol, and ethers such as ethylene glycol monoethyl ether and ethylene glycol monobutyl ether.

By the term "reaction product" used in the instant specification and claims is meant a reaction product formed by reacting a curing agent such as mentioned above with protocatechuic acid and/or gallic acid.

Protocatechuic acid and gallic acid are compounds represented by the following structural formulae, respectively;

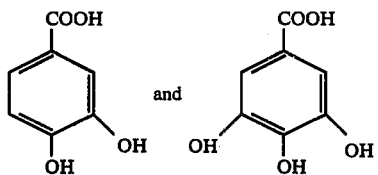

As is seen from the above structural formulae, they are polyhydric phenol compounds having one carboxyl group and at least 2 hydroxy groups at 3-, 4- and 5-positions with respect to the carboxyl group.

In case a polyhydric phenol compound having a similar structure in which phenolic hydroxyl groups are present at positions other than 3-, 4- and 5-positions with respect to the carboxyl group is employed, the intended effects of the present invention can hardly be attained. Further, a phenol compound having only one phenolic group at any of 3-, 4- and 5-positions with respect to the carboxyl group is hardly effective. The reason is thought to be that the number and position of the phenolic hydroxyl groups have an important relation with the chelate-forming activity between the compound used and the surface of an iron substrate.

Protocatechuic acid and/or gallic acid is used in an amount of 5 to 30% by weight, preferably 10to 25% by weight, based on the solid of the curing agent. When the amount of the chelate-forming compound is smaller than 5% by weight, the intended effects of the present invention can hardly be attained. On the other hand, when the amount of the compound exceeds 30% by weight, it is hardly dispersed in the composition with ease and gelation readily takes place in the curing agent. Further, the chelate is formed in an excessive amount over the necessary amount, and the resulting coated film becomes brittle and its humidity resistance is reduced. Moreover, use of an excessive amount of the chelate-forming compound is not preferred from the economical viewpoint.

The reaction between the curing agent and protocatechuic acid and/or gallic acid can be performed, for example, in the following manner.

As a first method, there can be mentioned a method in which protocatechuic acid and/or gallic acid is mixed with the above mentioned amino curing agent and the mixture is agitated at an appropriate temperature within a range of from room temperature to 100° C., whereby a salt is formed by the ionic reaction between the active hydrogen-containing nitrogen atoms of the curing agent and the carboxyl groups of protocatechuic acid and/or gallic acid and a stable reaction product is obtained.

As a second method, there can be mentioned a method in which protocatechuic acid and/or gallic acid is heated and agitated with the above-mentioned amino curing agent in the presence of an inert gas such as nitrogen gas at an optional temperature within a range of 100° to 240° C. for a time sufficient to form a prescribed amount of condensed water (3 to 10 hours in general), whereby a reaction product having protecatechuic acid and/or gallic acid introduced into the curing agent by the covalent bond can be obtained.

As is apparent from the foregoing illustration, the reaction conditions adopted in the second method are slightly different from those adopted in the first method. Accordingly, it is possible to obtain a reaction product having both the ionic bond and covalent bond introduced therein can be obtained by interrupting the reaction at an appropriate point and changing the reaction conditions appropriately. Of course, such reaction product can also be used in this invention.

The so obtained reaction product that is used in this invention has such characteristic properties that it is capable of cross-linking with the epoxy group-containing resin and of causing a chelate-forming reaction with the iron surface of an article to be coated. More specifically, when the coating composition is coated on the surface of an iron subtrate, the above reaction product causes a chealate-forming reaction with the surface of the substrate regardless of the degree of surface treatment of the iron substrate or the degree of formation of rust thereon, to thereby improve remarkably such properties of the coated film as water resistance, humidity resistance and corrosion resistance.

From the foregoing illustration, it will readily be understood that any substance including iron as the main ingredient and being capable o forming an iron chelate, such as iron plates and steel plates, can be used as the substrate to be coated in the present invention.

In general, it is preferred that the above reaction product be used in the liquid state. Of course, a reaction product which is solid at room temperature may also be used when it is diluted with water and/or a water-soluble solvent. Generally, the reaction product is used in the state that the solid content is 60 to 100% by weight.

In the present invention, in order to enhance the chelate-forming capacity, it is possible to incorporate in the reaction product a suitable amount, for example, 2 to 30% by weight of tannic acid.

The intended objects of the present invention cannot be attained at all by the single use of the above-mentioned aqueous dispersion of the epoxy group-containing resin (the main ingredient) or the reaction product (the curing agent composition) having introduced therein the chelate-forming compound. In other words, the two components should be mixed prior to application. Then, the composition is applied to iron, steel plates for various uses or iron plates on which rust is formed, according to a conventional coating method, for example, brush coating, spray coating or airless spraying method. The applied composition is then dried to form a film. A top coat may be formed on this coated film according to a conventional method for decoration or other purposes.

The composition of the present invention can also be used as an adhesive or the like by utilizing other characteristics of the composition.

In this invention, in order to improve the coating operation adaptability at the coating step, water or a small amount of a water-soluble solvent may further be added to the composition of this invention.

In the above-mentioned drying and filmforming steps, a cross-linking reaction is caused between the main ingredient and the curing agent composition. In order to perform this reaction effectively, the epoxy group-containing resin should be mixed with the curing agent composition formed by introducing the chelate-forming compound, at an appropriate mixing ratio. In general, it is preferred that both the components be mixed at such a ratio that the ratio of the epoxy groups in the main ingredient to the active hydrogen atoms bonded to the nitrogen atoms in the curing agent composition is within the range of from 1/2 to 2/1. However, a coating composition having the above ratio outside this range can also be used in this invention.

When the aqueous resin composition formed by mixing the two components prior to application is allowed to stand still for a long time, gelation is caused and the composition is rendered gelatinous. Accordingly, it is preferred that the composition be applied within 4 hours from just after mixing. The applied composition is then dried and cured, and a coated film excellent in various properties such as surface drying property, humidity resistance, corrosion resistance and adhesion under a high humidity condition can be obtained.

When the front and back faces of a dry coated film obtained from the composition of this invention were examined by the total reflection method of infrared spectrophotometry and the entire film was examined according to the film method of infrared spectrophotometry and when infrared absorption spectra obtained by these methods were compared with each other, it was found that the curing agent is rich in the surface portion of the film and the portion close to the coated substrate and the main ingredient is rich in the intermediate portion of the film. Accordingly, in the present invention, there is attained another advantage that the amount of the chelate-forming compound can be much reduced as compared with the case of a homogeneous composition including an organic solvent and this compound can be utilized very effectively.

Further, since water is used as the dispersion medium in the coating composition of this invention, iron as the substrate is kept in the readily ionizable state and a chelate can be formed very easily. Accordingly, a very good coated film can be obtained without using a chelating reaction promotor particularly.

Still further, even if a rust inhibiting pigment is not particularly incorporated, the composition of the present invention provides a coated film having excellent properties. Therefore, the risk of fire or the like can be completely eliminated, and no environmental pollution is caused at all. As is seen from the foregoing illustration, according to this invention, an aqueous resin composition providing a coated film highly improved in such properties as humidity resistance, corrosion resistance and adhesion under a high humidity condition can be prepared without causing any of these disadvantages. Therefore, the present invention makes great contributions to the art.

This invention will now be described in detail by reference to the following Examples, in which all of "parts" and "%" are by weight unless otherwise indicated.

EXAMPLE 1

30 parts of talc was kneaded with 15 parts of precipitated barium sulfate and 25 parts of water. Separately, 20 parts of a bisphenol epoxy resin (Epikote 828 manufactured by Shell Chemical Co.; epoxy equivalent = 184 — 194) was emulsified in 8 parts of water by using 2 parts of polyoxyethylene benzylated phenyl ether having an HLB value of 16.6 (Newcol 723 manufactured by Nippon Nyukazai Co.). The resulting epoxy resin emulsion was mixed with the above milled pigment mixture to form a main ingredient.

Separately, 50 parts of a polyamide resin (Tohmide 2500 manufactured by Fuji Kasei Kogyo Co.; amine value = 330 ± 20) was uniformly mixed with 2.5 parts of gallic acid and 25 parts of water at 40° C. for 30 minutes, to form a curing agent composition containing the chelate-forming compound.

The main ingredient was mixed with the curing agent composition at a weight ratio of 100/20 to obtain a coating composition according to the present invention. The coating composition was applied to a degreased mild steel plate (0.8 mm × 70 mm × 150 mm) by using a 14-mil applicator, and the applied coating was dried for 7 days in an air-conditioned chamber maintained at a temperature of 20° C. and a relative humidity of 75% and the properties of the resulting coated film were tested. Obtained results are shown in Table 2 together with the results obtained in subsequent Examples.

EXAMPLES 2 to 5

The same main ingredient as prepared in Example 1 was employed. Various kinds of curing agent compositions containing a chelate-forming compound were prepared in the same manner as in Example 1 except that the mixing ratio of gallic acid was changed as indicated below. The so formed curing agents were separately mixed with the main ingredient to form paints.

The formulation of the curing agent composition and the mixing ratio of the curing agent composition to the maim ingredient were as shown in Table 1.

By using so formed points, coated films were formed in the same manner as in Example 1 and their properties were tested to obtain results shown in Table 2, from which it will readily be understood that these compositions prepared according to the present invention provided coated films superior to coated films obtained in Comparative Examples given hereinafter in all of the salt spray test, the humidity resistance test, the accelerated salt water exposure test and the water resistance test.

Further, it was found that coated film obtained in these Examples were comparable or superior to the coated films obtained in Comparative Examples in other ordinary physical property tests.

Table 1
Formulation of Curing Agent Composition and Mixing Ratio to Main Ingredient (unit: part)

|  | Example 2 | Example 3 | Example 4 | Example 5 |
|---|---|---|---|---|
| Formulation of Curing Agent Composition |  |  |  |  |
| Tohmide 2500 | 50.0 | 50.0 | 50.0 | 50.0 |
| Gallic acid | 5.0 | 7.5 | 10.0 | 15.0 |
| Water | 25.0 | 25.0 | 25.0 | 25.0 |
| Main Ingredient/ Curing Agent Composition Mixing Ratio | 100/21 | 100/22 | 100/23 | 100/24 |

Table 2
Test Results (Examples 1 to 5)

| Example No. | Color of Coating Film | Salt Spray Test[1] | Himidity Resistance Test[2] | Accelerated Salt Water Exposure Test[3] | Water Resistance Test[4] |
|---|---|---|---|---|---|
| 1 | blackish brown | not changed for 500 hours | not changed for 500 hours | not changed for 500 hours | not changed |
| 2 | " | not changed for 800 hours | not changed for 700 hours | not changed for 700 hours | " |
| 3 | " | " | not changed for 800 hours | not changed for 800 hours | " |
| 4 | " | " | not changed for 700 hours | " | " |
| 5 | " | not changed for 700 hours | not changed for 500 hours | not changed for 700 hours | " |

Notes:
[1] tested according to the salt spray test method of JIS Z-2371.
[2] allowed to stand still at 50° C. and at least 97% RH.
[3] cross-cut test piece was dipped in 5% saline solution at 50° C. and subjected to the tape-peeling test.
[4] allowed to stand still in water (20° C.) for 30 days.

EXAMPLES 6 and 7

The main ingredient was prepared in the same manner as in Example 1 by using a polyglycol epoxy resin (DER 736 manufactured by Dow Chemical Co.; epoxy equivalent = 175 — 205) or a novolak epoxy resin (Epikote 152 manufactured by Shell Chemical Co.; epoxy equivalent = 172 — 179). The same chelate-forming compound-containing curing agent as used in Example 3 was mixed with the above main ingredient.

The composition of each paint is shown in Table 3 and results of the tests made on each coated film are collectively shown in Table 5.

Table 3

Compositions of Paints Obtained in
Examples 6 and 7 (unit: part)

|  | Example 6 | Example 7 |
|---|---|---|
| Main Ingredient | | |
| Talc | 30 | 30 |
| Precipitated barium sulfate | 15 | 15 |
| Water | 25 | 25 |
| DER 736 | 2 | — |
| Epikote 152 | 18 | 20 |
| Newcol 723 | 2 | 2 |
| Water | 8 | 8 |
| Main Ingredient/Curing Agent Composition Mixing Ratio | 100/22 | 100/22 |

EXAMPLES 8 and 9

A main ingredient was prepared in the same manner as in Example 1 except that polyoxyethylene nonylphenyl ether having an HLB value of 12.4 (Emulgen 909 manufactured by Kao-Atlas Co.) or polyoxethylene alkyl ester having an HLB value of 10.5 (Newcol 15 manufactured by Nippon Nyuk azai Co.) was used instead of the polyoxyethylene benzylated phenyl ether used in Example 1. The chelate-forming compound-containing curing agent composition as used in Example 3 was incorporated in the main ingredient.

Results of the tests made on properties of coated films prepared from the obtained paints are shown in Table 5.

Examples 10 to 12

The same main ingredient as prepared in Example 1 was employed. A chelate-forming compound-containing curing agent composition was prepared in the same manner as in Example 1. The formulation of the curing agent composition and the mixing ratio to the main ingredient were as shown in Table 4.

Results of the tests made on properties of coated films prepared from the so obtained resin compositions are shown in Table 5.

Table 4

Formulation of Curing Agent Composition
and Mixing Ratio to Main Ingredient

|  | Example 10 | Example 11 | Example 12 |
|---|---|---|---|
| Formulation of Curing Agent Composition | | | |
| Tohmide 2500 | — | 20 | — |
| Genamide 2000[1] | 50 | — | 25 |
| Adeka Hardener EH 531[2] | — | 30 | 25 |
| Gallic acid | 7.5 | 7.5 | 7.5 |
| Water | 25 | 25 | 25 |
| Main Ingredient/Curing Agent Composition Mixing Ratio | 100/22 | 100/22 | 100/22 |

Note:
[1] Tradename for the product manufactured by Dai-Ichi General Co.
[2] Tradename for the product manufactured by Asahi Electro-Chemical Co.

EXAMPLE 13

The same main ingredient as prepared in Example 1 was employed. A chelate-forming compound-containing curing agent composition prepared by uniformly mixing 50 parts of a polyamide resin (Tohmide 2500 manufactured by Fuji Kasei Kogyo Co.; amine value = 330 ± 20) with 5.0 parts of protocatechuic acid and 25 parts of water was used and it was incorporated into the main ingredient at a main ingredient/curing agent composition mixing weight ratio of 100/21. Results of the tests made on properties of a coated film obtained from the so prepared resin composition are shown in Table 5.

EXAMPLE 14

The same main ingredient as prepared in Example 1 was employed. 50 parts of the same polyamide resin as used in Example 13 was uniformly mixed with 10.0 parts of protocatechuic acid and 25 parts of water, and the resulting chelate-forming compound-containing curing agent composition was mixed with the main ingredient at a main ingredient/curing agent composition mixing weight ratio of 100/23. Results of the tests made on properties of a coated film prepared from the so obtained paint composition are shown in Table 5.

EXAMPLE 15

10 parts of red iron oxide, 25 parts of talc, 10 parts of precipitated barium sulfate and 30 parts of water were mixed and milled together. Separately, 20 parts of a bisphenol epoxy resin (Epikote 828 manufactured by Shell Chemical Co.; epoxy equivalent = 184 − 194) was emulsified in 8 parts of water by using 2 parts of polyoxyethylene benzylated phenyl ether having an HLB value of 16.6 (Newcol 723 manufactured by Nippon Nyukazai Co.), to form an epoxy resin emulsion. The emulsion was mixed with the above kneaded pigment mixture to form a main ingredient. Separately, 50 parts of the same polyamide resin as used in Example 13 was uniformly mixed with 7.5 parts of gallic acid and 25 parts of water to form a chelate-forming compound-containing curing agent composition.

The above main ingredient was mixed with the curing agent composition at a mixing weight ratio of 105/22. Results of the tests made on properties of a coated film prepared from the so obtained paint composition are shown in Table 5.

Table 5

Test Results (Examples 6 to 15)

| Example No. | Color of Coating Film | Salt Spray Test | Humidity Resistance Test | Accelerated Salt Water Exposure Test | Water Resistance Test |
|---|---|---|---|---|---|
| 6 | blackish brown | not changed for 800 hours | not changed for 800 hours | not changed for 800 hours | not changed |
| 7 | " | " | " | " | " |
| 8 | " | " | " | " | " |
| 9 | " | " | " | " | " |
| 10 | " | " | " | " | " |
| 11 | " | " | " | " | " |
| 12 | " | " | " | " | " |
| 13 | " | not changed for 700 hours | not changed for 700 hours | not changed for 700 hours | " |
| 14 | " | " | not changed for 600 hours | " | " |
| 15 | brown | " | " | " | " |

*: all the tests were conducted in the same manner as described in Table 2.

EXAMPLE 16

10 parts of red iron oxide, 30 parts of talc, 10 parts of precipitated barium sulfate, 0.05 part of sodium nitrite, 20 parts of the same bisphenol epoxy resin as used in Example 1 and 2 parts of the same polyoxyethylene benzylated phenyl ether emulsifier as used in Example 1 were kneaded by a three-roll mill, and the milled mixtured was dispersed at a high speed while incorporating gradually 40 parts of water in the mixture, to form a main ingredient. Separately, 50 parts of the same polyamide resin as used in Example 1 was uniformly mixed with 7.5 parts of gallic acid, 20 parts of water and 5 parts of ethylene glycol monobutyl ether to form a chelate-forming compound-containing curing agent composition.

The main ingredient was mixed with the curing agent composition at a mixing weight ratio of 112/22, and water was added to the mixture so that the viscosity was 50 to 60 poises as measured by a Rion viscometer (rotor No. 1). The so formed paint composition was applied to a sand-blased plate (1.6 mm × 50 mm × 150 mm) in a dry film thickness of 200$\mu$ by using an airless sprayer. The coated composition was naturally dried by placing the coated plate an air-conditioned chamber maintained at 20° C. and 75% RH for 7 days. Properties of the resulting coated film were tested to obtain the results shown in Table 7.

EXAMPLE 17

10 parts of red iron oxide, 30 parts of talc, 10 parts of precipitated barium sulfate, 2 parts of zinc phosphate, 18 parts of the same bisphenol epoxy resin as used in Example 1, 2 parts of an epoxidized polybutadiene (sold under tradename "Sumika Oil # 50" and manufactured by Sumitomo Chemical Co.), 2 parts of a non-ionic surface active agent (sold under tradename "Newcol 714" and manufactured by Nippon Nyukazai Co.) and 0.2 part of a water-soluble fluorin type surface active agent as a swelling agent were mixed and kneaded by using a three-roll mill. While incorporating gradually 40 parts of water in the kneaded mixture, it was dispersed at a high speed to obtain a main ingredient. Separately, 35 parts of the same polyamide resin as used in Example 1 was uniformly mixed with 15 parts of an amine adduct resin (sold under tradename "Fuji Cure 202" and manufactured by Fuji Kasei Kogyo Co.), 7.5 parts of gallic acid and 30 parts of water to form a chelate-forming compound-containing curing agent composition.

The main ingredient was mixed with the curing agent composition at a mixing weight ratio of 115/25, and water was added to the mixture so that the viscosity was 30 to 40 poises as measured by a Rion viscometer (rotor No. 1). The so formed paint was applied to a rusty mild steel plate (about 0.8 mm × 70 mm × 150 mm), which had been polished by sand paper (#180), in a dry film thickness of 200$\mu$ by using an airless sprayer, and the coated composition was dried under the same conditions as described in Example 1. Properties of the so obtained coated film were tested to obtain the results shown in Table 7.

EXAMPLE 18

10 parts of glass flake (having a standard thickness of 4$\mu$ and a size of 0.4 mm), 10 parts of red iron oxide, 20 parts of talc, 10 parts of precipitated barium sulfate, 10 parts of the same bisphenol epoxy resin as used in Example 1, 10 parts of another bisphenol epoxy resin (sold under tradename "Epikote 834" and manufactured by Shell Chemical Co.; epoxy equivalent = 230 = 270), 3 parts of phenyl glycidyl ether and 2 parts of the same non-ionic surface active agent as used in Example 17 were mixed and milled by using a three-rolled mill, and while incorporating gradually 40 parts of water into the kneaded mixture, it was dispersed at a high speed to obtain a main ingredient. Separately, 50 parts of the same polyamide resin as used in Example 1 was uniformly mixed with 5 parts of gallic acid, 2.5 parts of protocatechuic acid and 30 parts of water to obtain a chelate-forming compound-containing curing agent.

The main ingredient was mixed with the curing agent composition at a mixing weight ratio of 115/25, and water was added to the mixture so that the viscosity was 30 to 40 poises as measured by a Rion viscometer (rotor No. 1). The so formed paint was applied to a sand-blasted plate (1.6 mm × 50 mm × 150 mm) in a dry film thickness of 200$\mu$ by using a brush and the coated composition was dried under the same conditions as described in Example 1. Properties of the so obtained coated film were tested to obtain the results shown in Table 7.

EXAMPLE 19

10 parts of red iron oxide, 30 parts of talc, 10 parts of precipitated barium sulfate, 20 parts of a bisphenol epoxy resin (sold under tradename "Epikote DX-255" and manufactured by Shell Chemical Co.; epoxy equivalent = 182 = 212) and 1 part of a methylated melamine resin were mixed and milled by using a three-roll mill, and while incorporating gradually 40 parts of water into the kneaded mixture, it was dispersed at a high speed to obtain a main ingredient. Separately, 18 parts of a polyamide resin (sold under tradename "Epikure 4255" and manufactured by Shell Chemical Co.) was uniformly mixed with 2.5 parts of gallic acid and 11 parts of water to form a chelate-forming compound-containing curing agent composition.

The main ingredient was mixed with the curing agent composition at a mixing weight ratio of 111/31.5, and water was added thereto so that the viscosity was 50 to 60 poises as measured by a Rion viscometer (roter No. 1). The so obtained paint was coated on a sand-blasted plate (1.6 mm × 50 mm × 150 mm) in a dry film thickness of 200$\mu$ by using an airless sprayer, and the coated paint was dried under the same conditions as described in Example 1. Properties of the so formed coated film were tested to obtain the results shown in Table 7.

EXAMPLE 20

A main ingredient was prepared in the same manner as in Example 19 except that 5 parts of liquid coal tar was used instead of the methylated melamine resin used in Example 19. The same chelate-forming compound-containing curing agent as prepared in Example 19 was used.

The main ingredient was mixed with the curing agent composition at a mixing weight ratio of 114/31.5, and the resulting paint was applied and dried in the same manner as described in Example 19. Properties of the resulting coated film were tested to obtain the results shown in Table 7.

EXAMPLE 21

A main ingredient was prepared in the same manner as in Example 19 except that 2 parts of an epoxy ester resin (obtained by modifying the same epoxy resin as used in Example 1 with soybean fatty acid) was used instead of the methylated melamine resin used in Example 19. The same chelate-forming compound-containing curing agent composition as prepared in Example 19 was employed.

The main ingredient was mixed with the curing agent composition at a mixing weight ratio of 112/31.5. The resulting paint was coated and dried in the same manner as described in Example 19, and properties of the resulting coated film were tested to obtain the results shown in Table 7.

Table 6-continued

Kinds and Amounts of Curing Promotors and Their Effects (unit : part)

|  | Ex. 16 | Ex. 22 | Ex. 23 | Ex. 24 | Ex. 25 |
|---|---|---|---|---|---|
| Curing Property | | | | | |

Notes: Test conditions: temperature = 10° C., relative humidity = 80%, Curing time = 16 hours
Evaluation: X: slightly tacky
Δ: dry to the touch
0: dry to handle Table 7

Test Results (Examples 16 to 21)

| Example No. | Salt Spray Test | Humidity Resistance Test | Accelerated Salt Water Exposure Test | Water Resistance Test |
|---|---|---|---|---|
| 16 | not changed for 800 hours | not changed for 800 hours | not changed for 800 hours | not changed |
| 17 | " | " | " | " |
| 18 | " | " | " | " |
| 19 | not changed for 500 hours | not changed for 500 hours | " | " |
| 20 | not changed for 800 hours | not changed for 800 hours | " | " |
| 21 | not changed for 500 hours | not changed for 500 hours | " | " |

Note: Each test was conducted in the same manner as described in Table 2.

EXAMPLES 22 to 25

In order to improve the low-temperature curing property, as curing promotors, 2,4,6-tris(dimethylaminomethyl)phenol (indicated as A in Table 6), triethylene diamine (indicated as B in Table 6) and hexamethylene tetramine were added, as indicated in Table 6, into the same curing agent composition as used in Example 16. The resulting curing agent composition was mixed with the same main ingredient as used in Example 16, and the curing property of the resulting paint at 10° C. was examined to obtain the results shown in Table 6.

Table 6

Kinds and Amounts of Curing Promotors and Their Effects (unit : part)

|  | Ex. 16 | Ex. 22 | Ex. 23 | Ex. 24 | Ex. 25 |
|---|---|---|---|---|---|
| Composition of Paint | | | | | |
| Main ingredient (Example 16) | 112 | 112 | 112 | 112 | 112 |
| Curing Agent Composition (Example 16) | 22 | 22 | 22 | 22 | 22 |
| Promotor A | — | 0.5 | 1.0 | — | — |
| Promotor B | — | — | — | 1.0 | — |
| Hexamethylene tetramine | — | — | — | — | 1.0 |
| Low-Temperature | X | Δ | 0 | 0 | 0 |

COMPARATIVE EXAMPLE 1

The same main ingredient as prepared in Example 1 was used, and a curing agent formed by mixing 50 parts of the same polyamide resin as used in Example 13 uniformly with 10 parts of water was employed. The main ingredient was mixed with the curing agent at a mixing weight ratio of 100/16.

Properties of a coated film obtained from the resulting paint composition were tested to obtain the results shown in Table 9.

COMPARATIVE EXAMPLES 2 to 12

The same main ingredient as prepared in Example 1 was employed. In the same manner as described in Example 1, a curing agent composition was prepared by using a variety of polyhydric phenols all of which are outside the scope of the present invention. Formulations of the so prepared comparative curing agent compositions are shown in Table 8.

Properties of coated films formed from paint compositions prepared by mixing the main ingredient with these comparative curing agent compositions at mixing weight ratios shown in Table 8 were tested to obtain the results shown in Table 9.

Table 8

Formulation in Comparative Examples (unit: part)

| | 1 | 2 | 3 | 4 | 5 | 6 | 7 | 8 | 9 | 10 | 11 | 12 |
|---|---|---|---|---|---|---|---|---|---|---|---|---|
| Couring Agent Composition | | | | | | | | | | | | |
| Tohmide 2500 | 50 | 50 | 50 | 50 | 50 | 50 | 50 | 50 | 50 | 50 | 50 | 50 |
| Pyrogallol | | 5 | | | | | | | | | | |
| Benzoic acid | | | 5 | | | | | | | | | |
| Salicylic acid | | | | 5 | | | | | | | | |
| p-Hydroxybenzoic acid | | | | | 5 | | | | | | | |
| 2,3-Dihydroxybenzoic acid | | | | | | 5 | | | | | | |
| 2,4-Dihydroxybenzoic acid | | | | | | | 5 | | | | | |
| 2,5-Dihydroxybenzene acid | | | | | | | | 5 | | | | |
| 2,6-Dihydroxybenzoic acid | | | | | | | | | 5 | | | |
| 3,5-Dihydroxybenzoic acid | | | | | | | | | | 5 | | |
| n-Propyl gallate | | | | | | | | | | | 5 | |
| n-Lauryl gallate | | | | | | | | | | | | 5 |
| Water | 10 | 25 | 25 | 25 | 25 | 25 | 25 | 25 | 25 | 25 | 25 | 25 |
| Main Ingredient/Curing Agent Composition Mixing | 100/16 | 100/21 | 100/21 | 100/21 | 100/21 | 100/21 | 100/21 | 100/21 | 100/21 | 100/21 | 100/21 | 100/21 |

Table 8-continued
Formulation in Comparative Examples (unit: part)

| Weight Ratio | 1 | 2 | 3 | 4 | 5 | 6 | 7 | 8 | 9 | 10 | 11 | 12 |
|---|---|---|---|---|---|---|---|---|---|---|---|---|
|  |  |  |  |  |  |  |  |  |  |  |  |  |

Table 9
Test Results in Comparative Examples

| Comparative Example No. | Color of Coating Film | Salt Spray Test | Humidity Resistance Test | Accelerated Salt Water Exposure Test | Water Resistance Test |
|---|---|---|---|---|---|
| 1 | gray | blister formed in 100 hours | blister formed in 100 hours | completely peeled in 20 hours | entire surface blistered in 2 days |
| 2 | blackish brown | " | " | " | " |
| 3 | gray | blister formed in 50 hours | entire surface blistered in 20 hours | " | entire surface blistered in 1 day |
| 4 | " | blister formed in 100 hours | blister formed in 100 hours | " | entire surface blistered in 2 days |
| 5 | " | " | blister formed in 150 hours | " | entire surface blistered in 3 days |
| 6 | " | " | " | " | " |
| 7 | " | " | blister formed in 100 hours | " | entire surface blistered in 2 days |
| 8 | light brown | blister formed in 100 hours | blister formed in 150 hours | completely peeled in 50 hours | entire surface blistered in 3 days |
| 9 | gray | " | blister formed in 100 hours | completely peeled in 20 hours | entire surface blistered in 2 days |
| 10 | " | " | blister formed in 150 hours | peeled in 20 hours | entire surface blistered in 3 days |
| 11 | " | blister formed in 50 hours | entire surface blistered in 100 hours | completely peeled in 20 hours | entire surface blistered in 2 days |
| 12 | " | blister formed in 100 hours | entire surface blistered in 150 hours | peeled in 20 hours | entire surface blistered in 3 days |

Note: Each test was conducted in the same manner as described in Table 2.

From the above results, it will readily be understood that the resin composition of the present invention is much superior to the composition of Comparative Example 1 free of a polyhydric phenol carboxylic acid with respect to the corrosion resistance, humidity resistance and water resistance of the resulting coated film.

Further, it will readily be understood that the resin composition of the present invention is much superior to resin compositions of Comparative Examples 2 to 12 containing a polyhydric phenol free of a carboxyl group, a polyhydric phenol carboxylic acid other than protocatechuic acid and gallic acid, or an ester of such acid, with respect to properties of the resulting film.

EXAMPLE 26

A mixture of 30 parts of talc, 15 parts of precipitated barium sulfate and 25 parts of water was kneaded. Separately, 20 parts of a bisphenol epoxy resin (Epikote 828 manufactured by Shell Chemical Co.; epoxy equivalent = 184 − 194) was emulsified in 8 parts of water by using 2 parts of polyoxyethylene benzylated phenyl ether having an HLB value of 16.6 (sold under tradename "Newcol 723" and manufactured by Nippon Nyukazai Co.). The so formed emulsion was mixed with the above milled pigment mixture to form a main ingredient. Separately, 50 parts of a polyamide resin (sold under tradename "Tohmide 2500" and manufactured by Fuji Kasei Kogyo Co.; amine value = 330 ± 20) was reacted with 5 parts of gallic acid at 180° C. in the presence of an inert gas until a prescribed amount of water was formed by the reaction and cooled to obtain a chelate-forming curing agent.

The above main ingredient was mixed with the so obtained chelate-forming curing agent at a mixing weight ratio of 100/13 to obtain an aqueous epoxy resin composition of the present invention. The composition was applied to a degreased mild steel plate (0.8 mm × 70 mm × 150 mm) by using a 20-mil applicator, and the coated composition was dried by placing the coated plate in an air-conditioned chamber maintained at 20° C. and 75% RH for 7 days. Properties of the resulting coated film were tested.

Results of the tests are collectively shown in Table 10 together with the results obtained in subsequent Examples.

From the test results, it is apparent that the coated film obtained from the aqueous epoxy resin composition of this Example according to the present invention had properties superior to those of the coated film prepared from the composition of Comparative Example 13 given hereinafter.

EXAMPLE 27

A mixture of 10 parts of red iron oxide, 25 parts of talc, 35 parts of precipitated barium sulfate and 30 parts of water was milled. Separately, 20 parts of a polyglycol epoxy resin (sold under tradename "DER 736" and manufactured by Dow Chemical Co.; epoxy equivalent = 175 − 205) was emulsified in 8 parts of water by using 2 parts of polyoxyethylene nonylphenyl ether having an HLB value of 12.4 (sold under tradename "Emulgen 909" and manufactured by Kao-Atlas Co.) to form a resin emulsion. This resin emulsion was mixed with the above kneaded pigment mixture to form a main ingredient.

Separately, 35 parts of the same polyamide resin as used in Example 26 was reacted at 170°-190° C. in the presence of an inert gas with 15 parts of an amine adduct resin (sold under tradename "Fuji Cure 202" and manufactured by Fuji Kasei Kogyo Co.; active hydrogen equivalent = 120) and 7.5 parts of gallic acid until a prescribed amount of water was formed by the reaction, to form a chelate-forming curing agent.

The main ingredient was mixed with this curing agent at a mixing weight ratio of 105/14 to form a paint.

The paint was applied and dried in the same manner as in Example 26. Properties of the resulting coated film were tested to obtain the results shown in Table 10.

From the test results, it is seen that the coated film prepared from the coating composition of this Example was much superior to coated films obtained from resin compositions prepared in Comparative Examples given hereinafter with respect to the salt spray resistance, humidity resistance, salt water exposure resistance and water resistance.

EXAMPLE 28

A mixture of 30 parts of talc, 15 parts of precipitated barium sulfate and 25 parts of water was kneaded. Separately, 20 parts of the same bisphenol epoxy resin as used in Example 26 was emulsified in 8 parts of water by using 2 parts of the same polyoxyethylene benzylated phenyl ether as used in Example 26 (having an HLB value of 16.6). The resulting epoxy resin emulsion was mixed with the above kneaded pigment mixture to form a main ingredient.

Separately, 50 parts of the same polyamide resin as used in Example 26 was reacted at 170° C. in the presence of an inert gas with 7.5 parts of protecatechuic acid until a prescribed amount of water was formed by the reaction, to form a chelate-forming curing agent. The above main ingredient was mixed with this curing agent at a mixing weight ratio of 100/14.

The resulting resin composition was applied and dried in the same manner as in Example 26, and properties of the resulting coated film were tested to obtain the results shown in Table 10.

EXAMPLE 29

A main ingredient was prepared in the same manner as in Example 26 except that 2 parts of polyoxyethylene benzylated phenyl ether having an HLB value of 15.0 (sold under tradename "Newcol 714" and manufactured by Nippon Nyukazai Co.) instead of 2 parts of the polyoxyethylene benzylated phenyl ether having an HLB value of 16.6, which was used in Example 26.

Separately, 30 parts of the same polyamide resin as used in Example 26, 20 parts of the same amine adduct resin as used in Example 27, 5.0 parts of gallic acid and 2.5 parts of protecatechuic acid were reacted at 170°-180° C. in the presence of an inert gas until a prescribed amount of water was formed by the reaction and cooled, to form a curing agent into which a chelate-forming compound was introduced by the covalent bond.

The above main ingredient was mixed with the so formed chelate-forming curing agent at a mixing weight ratio of 100/15 to form a paint.

The paint was applied and dried in the same manner as in Example 26, and properties of the resulting coated film were tested to obtain the result shown in Table 10.

COMPARATIVE EXAMPLE 13

The same main ingredient as prepared in Example 26 was employed. The same unmodified polyamide resin as used in Example 26 was employed as the curing agent. The main ingredient was mixed with the curing agent at a mixing weight ratio of 100/14. The resulting composition was applied and dried in the same manner as in Example 26. Properties of the resulting coated film were tested to obtain the results shown in Table 10.

COMPARATIVE EXAMPLE 14

The same main ingredient as prepared in Example 27 was employed. A homogeneous mixture of 35 parts of the same polyamide resin as used in Example 26 and 15 parts of the same amine adduct as used in Example 27 was used as the curing agent.

The main ingredient was mixed with the curing agent at a mixing weight ratio of 100/13. The resulting paint was applied and dried in the same manner as in Example 26, and properties of the resulting coated film were tested to obtain the results shown in Table 10.

Table 10

Comparative Test Results

| | Salt Spray Test | Humidity Resistance Test | Salt Water Exposure Test | Water Resistance Test |
|---|---|---|---|---|
| Example 26 | not changed in 500 hours | not changed in 500 hours | not changed | not changed |
| Example 27 | not changed in 300 hours | not changed in 300 hours | " | " |
| Example 28 | not changed in 400 hours | not changed in 400 hours | " | " |
| Example 29 | not changed in 500 hours | " | " | " |
| Comparative Example 13 | blister formed in 100 hours | blister formed in 100 hours | entire surface blistered in 2 days | entire surface blistered in 2 days |
| Comparative Example 14 | blister formed in 50 hours | blister formed in 50 hours | " | " |

Note:
Each test was conducted in the same manner as described in Table 2. In the salt water exposure test, the temperature was changed to room temperature from the temperature of 50° C. used in the test of Table 2.

EXAMPLE 30

In 410 parts of water were dissolved 12.0 parts of sodium lauryl sulfate, 8.0 parts of polyoxyethylene lauryl ether and 2.5 parts of potassium persulfate, and a mixture of 180.0 parts of methyl methacrylate, 160 parts of butyl acrylate and 60.0 parts of glycidyl methacrylate was added to the solution to disperse the monomers in the solution, whereby an emulsion A was obtained. In a flask was charged 167.5 parts of water, and after nitrogen substitution was conducted for 5 minutes, some (168.0 parts) of the emulsion A was added to the flask. The temperature was elevated to 75° C. and at this temperature, initial polymerization was conducted for 30 minutes. The remainder (662 parts) of the emulsion A was added dropwise to the charge of the flask at 75 ± 1° C. over a period of 1.0 to 1.5 hours. After completion of the dropwise addition, the reaction mixture was aged at the same temperature for 1 hour. Then, 50 parts of the resulting emulsified copolymer was kneaded with a mixture of 15 parts of talc, 10 parts of precipitated barium sulfate, 5 parts of zinc phosphate and 5 parts of water in a pot mill to obtain a main ingredient.

Separately, 50 parts of a polyamide resin (sold under tradename "Tohmide 2500" and manufactured by Fuji Kasei Kogyo Co.; amine value = 330 ± 20) was mixed at room temperature with 5 parts of gallic acid and 25 parts of water to obtain a chelate-forming curing agent composition.

In order to facilitate the operation of mixing the main ingredient with the curing agent composition, acetic acid was added to the curing agent composition in advance in an amount of 5% to effect partial neutralization.

Then, the main ingredient was mixed with the chelate-forming curing agent composition at a mixing weight ratio of 100/5. The so formed composition was applied to a degreased mild steel plate (0.8 mm × 70 mm × 150 mm) by using a 14-mil applicator, and the applied composition was dried by placing the coated plate in an air-conditioned chamber maintained at 20° C. and 75% RH for 7 days. Properties of the resulting coated film were tested. obtained results are shown in Table 12 together with the results obtained in subsequent Examples.

EXAMPLE 31

The same main ingredient as prepared in Example 30 was used. Separately, a curing agent was prepared by reacting 30 parts of a polyamide resin (sold under tradename "Tohmide 2500" and manufactured by Fuji Kasei Kogyo Co.; amine value = 330 ± 20), 20 parts of an amine adduct resin (sold under tradename "Fuji Cure 202" and manufactured by Fuji Kasei Kogyo Co.; active hydrogen equivalent = 120) and 7.5 parts of protocatechuic acid at 160° – 180° C. in the presence of an inert gas until a prescribed amount of water was formed by the reaction. In order to facilitate the operation of mixing the main ingredient with the so formed chelate-forming curing agent, acetic acid was added to the curing agent in advance in an amount of 5% to effect partial neutralization.

The main ingredient was mixed with the chelate-forming curing agent at a mixing weight ratio of 100/3.9 to obtain a resin composition according to the present invention. The so formed coating composition was applied and dried in the same manner as in Example 30, and properties of the resulting coated film were tested to obtain results shown in Table 12.

EXAMPLES 32 to 34

An emulsified copolymer was prepared in the same manner as described in Example 30 except that in the emulsion A of the main ingredient, 180.0 parts of styrene was used instead of 180.0 parts of methyl methacrylate used in Example 30.

Then, 50 parts of the so prepared emulsified copolymer was kneaded with 15 parts of talc, 10 parts of precipitated barium sulfate, 5 parts of zinc molybdate and 5 parts of water in a pot mill to obtain the main ingredient used in Examples 32 to 34.

A chelate-forming curing agent was prepared in the same manner as in Example 30 by adopting a formulation indicated in Table 11. The main ingredient was mixed with the curing agent at a mixing weight ratio indicated in Table 11. In order to facilitate this mixing operation, polyoxyethylene benzylphenyl ether (nonionic surface active agent) was added to the curing agent in advance in an amount of 5%. The resulting composition was applied and dried in the same manner as in Example 20, and properties of the resulting coated film were tested to obtain the results shown in Table 12.

Table 11

Formulation of Curing Agent and Mixing Ratio to Main Ingredient
(unit: part)

| | Example 32 | Example 33 | Example 34 |
|---|---|---|---|
| Formulation of Curing Agent | | | |
| Tohmide 2500 | 50 | — | 50 |
| Epikote 3255[1] | — | 40 | — |
| Fuji Cure 202 | — | 10 | — |
| Gallic acid | 7.5 | — | 5 |
| Tannic acid | — | — | 3 |
| Protocatechuic acid | — | 7.5 | — |
| Water | 25 | 25 | 25 |
| Main Ingredient/Curing Agent Composition Mixing Weight Ratio | 100/5.5 | 100/5.5 | 100/5.5 |

Note:
[1] Tradename for the polyamide resin manufactued by Shell Chemical Co.

Comparative Example 15

The same main ingredient as prepared in Example 30 was employed. A homogeneous mixture was prepared from 50 parts of the same polyamide resin as used in Example 30 and 25 parts of water, and 5% of acetic acid was added to the mixture. The resulting mixture was used as a curing agent.

The main ingredient was mixed with the curing agent at a mixing weight ratio of 100/3.3 to form a paint composition. Properties of the coated film prepared from this paint composition were tested to obtain the results shown in Table 12.

Comparative Example 16

The same main ingredient as prepared in Example 30 was used. A homogeneous mixture was prepared from 30 parts of the same polyamide resin as used in Example 31, 20 parts of the same amine adduct resin as used in Example 31 and 25 parts of water, and 5% of acetic acid was added to the mixture. The resulting mixture was used as the curing agent.

The main ingredient was mixed with the curing agent at a mixing weight ratio of 100/3.3 to obtain a paint composition. Properties of the coated film prepared from this paint composition were tested to obtain the results shown in Table 12.

Comparative Example 17

The same main ingredient as prepared in Example 33 was used. A homogeneous mixture was formed from 40 parts of the same polyamide resin as used in Example 33, 10 parts of the same amine adduct resin as used in Example 33 and 25 parts of water, and 5% of a non-ionic surface active agent was added to the mixture. The resulting mixture was used as the curing agent.

The main ingredient was mixed with the curing agent at a mixing weight ratio of 100/3.5 to form a paint composition, and properties of the coated film prepared from this paint composition were tested to obtain the results shown in Table 12.

Table 12
Test Results

|  | Salt Spray Test | Humidity Resistance Test | Salt Water Exposure Test | Water Resistance Test |
|---|---|---|---|---|
| Example 30 | not changed in 300 hours | not changed in 300 hours | not changed | not changed |
| Example 31 | not changed in 250 hours | not changed in 250 hours | " | " |
| Example 32 | not changed in 300 hours | not changed in 300 hours | " | " |
| Example 33 | " | not changed in 250 hours | " | " |
| Example 34 | " | not changed in 300 hours | " | " |
| Comparative Example 15 | blister and rust formed in 50 hours | blister and rust formed in 50 hours | blister and rust formed on entire surface in 2 days | blister and rust formed on entire surface in 2 days |
| Comparative Example 16 | " | " | " | " |
| Comparative Example 17 | " | " | " | " |

Note:
Each test was conducted in the same manner as described in Table 2. In the salt water exposure test, the temperature was changed to room temperature from the temperature of 50° C. used in the test of Table 2.

What is claimed is:

1. A two-pack type aqueous resin composition having a chelate-forming capacity, which comprises
   1. an aqueous dispersion of a resing having in the molecule at least two epoxy groups, and
   2. a reaction product formed between an amino curing agent having in the molecule at least two nitrogen atoms and active hydrogen atoms bonded thereto and 5–30% by weight based on the curing agent of protocatechuic acid and/or gallic acid.

2. An aqueous resin composition as set forth in claim 1 wherein said reaction product is obtained by reacting the amino curing agent with 10 to 25% by weight, based on the curing agent, of protocatechuic acid and/or gallic acid.

3. An aqueous resin composition as set forth in claim 1 wherein the resin having in the molecule at least 2 epoxy groups is an epoxy resin.

4. An aqueous resin composition as set forth in claim 3 wherein the epoxy resin is at least one member selected from the group consisting of bis-phenol epoxy resins, novolak type epoxy resins and polyglycol epoxy resins.

5. An aqueous resin composition as set forth in claim 1 wherein the resin having in the molecule at least 2 epoxy groups is a copolymer of an epoxy group-containing $\alpha,\beta$-ethylenically unsaturated monomer with other $\alpha,\beta$-ethylenically unsaturated monomer copolymerizable therewith.

6. An aqueous resin composition as set forth in claim 5 wherein the epoxy group-containing $\alpha,\beta$-ethylenically unsaturated monomer is used in an amount of 5 to 30% by weight and another $\alpha,\beta$-ethylenically unsaturated monomer copolymericable therewith is used in an amount of 95 to 70% by weight.

7. An aqueous resin composition as set forth in claim 1 wherein tannic acid is further incorporated in an amount of 2 to 30% by weight based on the reaction product.

8. An aqueous resin composition as set forth in claim 1 wherein the resin having in the molecule at least 2 epoxy groups is mixed with the reaction product so that the ratio of epoxy groups/active hydrogen atoms is within a range of from 178 to 2/1.

9. An aqueous resin composition as set forth in claim 1 wherein the amino curing agent having in the molecule at least 2 nitrogen atoms and active hydrogen atoms bonded thereto is at least one member selected from the group consisting of amine adduct resins and polyamide resins polyamines.

10. The composition according to claim 9 wherein the resin is a bis-phenol epoxy resin and the amino curing agent is a polyamide resin which is reacted with gallic acid.

11. The composition according to claim 9 wherein the resin is a polyglycol epoxy resin and the amino curing agent is a polyamide which is reacted with gallic acid.

12. The composition according to claim 9 wherein the resin is a bis-phenol epoxy resin and the amino curing agent is a polyamide resin which is reacted with gallic acid.

13. The composition according to claim 1 wherein said resin having in the molecule at least two epoxy groups is emulsified in water with an anionic surface active agent or a non-ionic surface active agent or a mixture thereof.

14. The composition according to claim 1 wherein said epoxy resin is solid at room temperature and a monoepoxy compound in the amount up to 20% by weight of said resin is added to said epoxy resin.

15. The composition according to claim 1 wherein a resin which is a melamine resin, a urea resin, a phenolic resin, a polybutadiene, an alkyd resin or a polyester resin is added to said resin containing at least two epoxy groups, in an amount up to 20% by weight of said resin which has at least two epoxy groups.

* * * * *